S. P. PROCK.
ANIMAL YOKE.
APPLICATION FILED NOV. 23, 1915.
1,241,443. Patented Sept. 25, 1917.
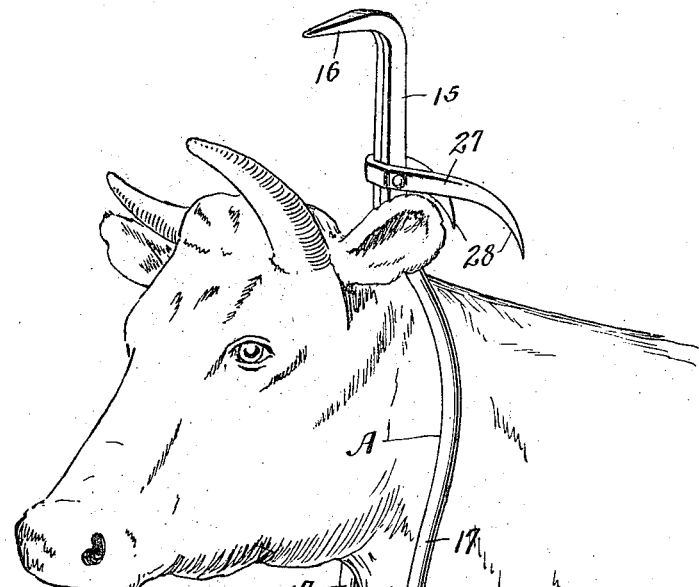
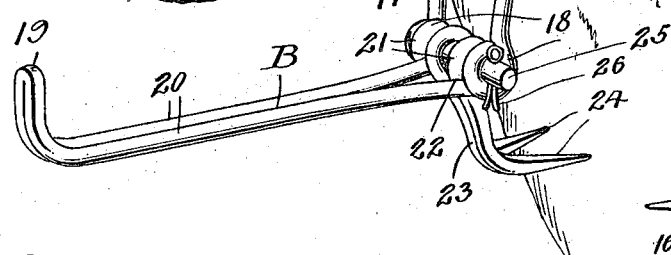
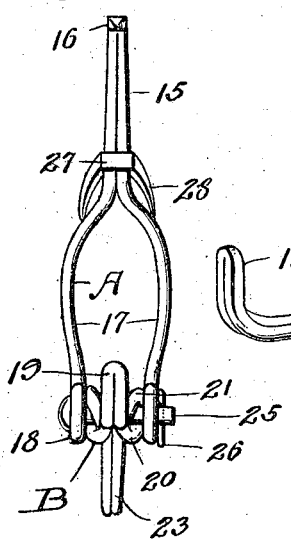
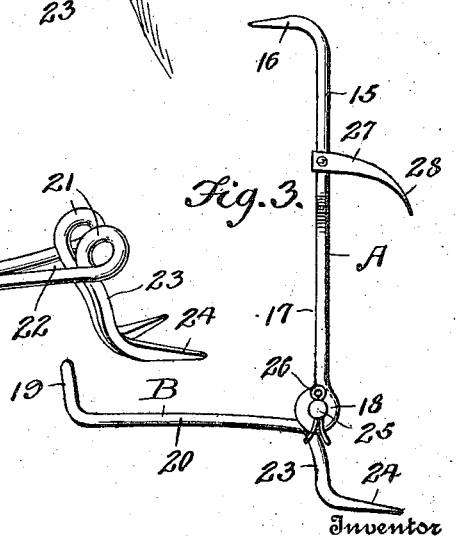
Inventor
S. P. Prock,
By Victor J. Evans
Attorney
Witnesses

UNITED STATES PATENT OFFICE.

SILAS P. PROCK, OF ERICK, OKLAHOMA.

ANIMAL-YOKE.

1,241,443.  Specification of Letters Patent.  Patented Sept. 25, 1917.

Application filed November 23, 1915. Serial No. 63,008.

*To all whom it may concern:*

Be it known that I, SILAS P. PROCK, a citizen of the United States, residing at Erick, in the county of Beckham and State of Oklahoma, have invented new and useful Improvements in Animal-Yokes, of which the following is a specification.

This invention relates to animal yokes or pokes which are applied to horses and cattle for the purpose of preventing such animals from breaking through fences, the object being to provide an implement which, when an attempt is made to pass through a fence, will prick the animal, thereby discouraging such attempt.

A particular object of the present invention is to produce a device of very simple and inexpensive construction which may be readily applied to a cow or other animal for the purpose indicated and which, while not hindering the animal from grazing, will operate efficiently to prevent fence jumping or breaking.

A further object of the invention is to produce a simple and efficient implement which may be applied or replaced by detaching or replacing a single connecting member.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figure 1 is a perspective view showing the yoke applied to a cow.

Fig. 2 is a front view of the yoke detached.

Fig. 3 is a side elevation.

Fig. 4 is a perspective view of the poke bar detached from the yoke.

Corresponding parts in the several figures are denoted by like characters of reference.

The improved device is composed of two main parts or members, namely the yoke A and the poke bar B.

The yoke member A is provided with an upwardly extending arm 15 terminating at its upper end in a forwardly extending prong or hook 16. The limbs 17 of the yoke are provided at their lower ends with terminal eyes 18.

The poke bar B is provided at its forward end with an upturned prong or hook 19. The rearward portion of the poke bar is provided to form limbs 20, said limbs being bent to form eyes 21, the rear portions of the limbs being bent downwardly through the space 22 intervening between the limbs and extended downwardly, the downwardly extended portions lying closely together and forming arms 23 which are provided at their lower ends with rearwardly extending divergent prongs or bars 24. The poke bar is connected with the yoke by means of a pin or bolt 25 that extends through the eyes 18 of the yoke and through the eyes 21 of the poke bar, said pin or bolt being provided with an aperture for the passage of a cotter 26 whereby it may be secured in position.

Secured on the upwardly extending arm 15 of the yoke is a fork member 27 having rearwardly extending downturned tines 28.

In practice, the improved device may be secured upon the neck of an animal by detaching the pin 25 and removing the poke bar B, which latter when replaced, will retain the device securely in position. While the animal is grazing the forward end of the poke bar having the upturned hook 19 will engage the ground and will not interfere with the animal grazing, it being evident that at the same time the prongs 24 will be held away from the breast of the animal, while the yoke itself will tilt forwardly so as to maintain the tines 28 at a distance from the neck of the animal. Should the animal attempt to break through or to jump over a fence, one or both of the hooks 16, 19 will become engaged with the fence wires, thereby causing the poke bar, as well as the yoke, to rock about the axis of the pin or bolt 25, bringing the prongs 24 or the tines 28 in engagement with the breast and the neck of the animal, respectively, causing it to desist.

It is obvious that the parts are to be so proportioned and arranged that unless restive and endeavoring to break through or jump over a fence, the animal to which the device is applied will suffer no inconvenience.

Having thus described the invention, what is claimed as new, is:—

An animal poke comprising a yoke having an upwardly extending integral arm provided with a forwardly extending hook, the limbs of the yoke being bent to form eyes at the lower ends thereof, a fork secured on the upwardly extending arm and having rearwardly extending downturned prongs, a poke bar having an upwardly extending hook at its forward end the rearward portion of said bar being bifurcated to form limbs having rearwardly extending prongs and said limbs being bent to form eyes substantially at the juncture thereof with the body of the bar, said eyes being positioned intermediate the eyes formed at the lower ends of the limbs of the yoke, and a pivot member extending through the several eyes to form a pivotal connection between the yoke and the poke bar.

In testimony whereof I affix my signature in presence of two witnesses.

SILAS P. PROCK.

Witnesses:
J. S. PYLE,
ANDREW JOHNSON.

Copies of this patent may be obtained for five cents each, by addressing the "Commissioner of Patents, Washington, D. C."